Sept. 15, 1970      D. MacDONALD ET AL      3,528,875

SELF-ALIGNING SANDWICH-TYPE STRUCTURAL PANELS

Original Filed Oct. 12, 1964      5 Sheets-Sheet 1

INVENTORS
DONALD MacDONALD &
ROY J. BROWN
BY
ATTORNEYS

Sept. 15, 1970     D. MacDONALD ET AL     3,528,875
SELF-ALIGNING SANDWICH-TYPE STRUCTURAL PANELS
Original Filed Oct. 12, 1964     5 Sheets-Sheet 5

Fig. 22

INVENTORS
DONALD MAC DONALD &
ROY J. BROWN
BY
ATTORNEYS 3,528,875
Patented Sept. 15, 1970

3,528,875
SELF-ALIGNING SANDWICH-TYPE
STRUCTURAL PANELS
Donald MacDonald, San Jose, and Roy J. Brown, Los Gatos, Calif., assignors to Owens-Corning Fiberglas Corporation, a corporation of Delaware
Continuation of application Ser. No. 403,199, Oct. 12, 1964. This application Mar. 25, 1968, Ser. No. 715,931
Int. Cl. B32b *3/28;* E04b *2/32;* E04c *2/32*
U.S. Cl. 161—132                                                       5 Claims

ABSTRACT OF THE DISCLOSURE

Sandwich type panels which have two opposed facing members separated and supported by webs diagonally inclined between the facing members, the webs being corrugated throughout their length and/or having planar spacing and supporting surfaces to cause the product to be self-aligning and self-supporting when folded.

REFERENCE TO RELATED APPLICATION

This is a continuation of Ser. No. 403,199, filed Oct. 12, 1964, now abandoned.

This invention relates to sandwich-type panel structure and the method and apparatus for producing same, and more particularly to certain novel structures which may be fabricated from resin impregnated fibrous materials as well as other material.

Many problems arise in connection with the manufacture of sandwich-type panel structures generally and particularly from resin impregnated fibrous materials because of the particular properties of the resin impregnated component parts in the structure and operations involved in forming and maintaining the shape of the structure to insure that the structure will bear up under substantial compressive loads.

Previous approaches to the solution of this problem are exemplified by the disclosures in U.S. Pat. 2,406,051, issued Aug. 20, 1946 and U.S. Pat. 3,048,198, issued Aug. 7, 1962. While the solutions illustrated in the above patents have been satisfactory for their particular applications, industry still requires a low cost, high strength structure which may be manufactured continuously on a low maintenance line, and which may provide final structures of varied geometrical configurations allowing use in many different applications with excellent reliability.

By taking a totally new approach to the problems of the formation of the core of a sandwich structure it has been possible to provide a new product, a new method of making the product, and novel apparatus for producing the product.

It is, accordingly, an object of this invention to provide improved structural panel.

It is a further object of this invention to provide an improved method of fabricating such a structure.

A further object of this invention is to provide improved methods and apparatus for fabricating the above novel structures.

A still further object of this invention is to provide an improved means for fabricating sandwich-type panel structures, which means and method is not only useful with resin impregnated fibrous materials but also with other materials adaptable for use with the disclosure herein.

The present invention features a product adaptable for folding into a self-aligning and self-supporting sandwich-type construction including a sequence of successively hinged sections. Each sequence has at least one facing section for a first side of the sandwich, a facing section for a second side of the sandwich, and section means for spacing and supporting the facing sections. The spacing means is shown as having one spacing surface and one support surface. The spacing surface is adapted to abut a similar surface of a preceding or an adjacent spacing and supporting section means when the product is folded, while the support surface is adapted to abut one facing section when the product is folded. In the preferred embodiment shown herein, the spacing and supporting means has second spacing and supporting surfaces, with the second spacing surface adapted to abut a similar spacing surface of a succeeding spacing and supporting means when the product is folded and the second supporting surface is adapted to abut the remaining facing section when the product is folded. Again, in the preferred embodiment, the spacing and supporting surfaces are connected by a surface which is inclined when the product is folded. Glass fiber reinforcement means are utilized in the preferred embodiment and the fibers are oriented in the inclined surface to be stressed when buckling forces in the inclined surfaces result from a compressive force applied to the facing sections.

To accomplish the self-aligning feature of the sandwich construction alternate ones of the successively hinged sections form the first and second facings of the sandwich construction. The sections in between the facing sections are formed in a three-dimensional configuration having a plurality of planar surfaces which, when extended, define a prism. The facing sections are then hinged at opposite ends of a diagonal of the prism whereby when the product is folded the planar surfaces support and space alternate facing sections. This three-dimensional configuration is most easily achieved by providing a connecting surface between the planar surfaces which comprises transversely extending corrugations in each of the sections connecting the facing sections. The corrugations comprise transverse rows of axially extending ridges and furrows, the hinging being accomplished between successive facing and corrugated sections along a line intermediate the axially extending peak lines of adjacent ridges and furrows. The planar surfaces are formed along the corrugation by forming a support or spacing surface at each end of each ridge and furrow with the surfaces being inclined toward the middle of their respective ridge or furrow. As is illustrated herein, a support surface at one end of the ridge abuts against an upper or first facing section, when the product is folded, while a spacing surface at the other end of the ridge abuts against a similar spacing surface formed in a ridge in an adjacent corrugated section. A support surface of the end of the furrow abuts against the second or bottom facing, when the product is folded, while a spacing surface at the other end of the furrow abuts against a similar spacing surface formed in a furrow in an adjacent corrugated section. Thus, the support and spacing surfaces properly align, space and support the facings and the corrugated sections when folding the basic sheet into the sandwich-type panel structure.

When all of the facing sections, both top and bottom, are of the same length a substantially flat sandwich-type panel is formed when the sections are folded. When every other one of the facing sections are of the same axial lengths while the remaining facing sections are of identical longer axial lengths, then an arched sandwich-type panel construction is formed when the sections are folded. When alternate ones of the facing sections are arcuate in cross section and of identical arc length while the remaining ones of the facing sections are also arcuate in cross section but have longer identical arc lengths then the formation of an arcuate sandwich-type panel construction results when the sections are folded. It is, of course, to be noted that with both the arched and arcuate sandwich panel constructions the inclusion of sufficient successively hinged sections cause both types of construction to close on themselves and form conduits or hollow cylinders, respectively.

In brief, then, there is disclosed herein a product adapted to be folded into a sandwich type panel which comprises, in the preferred embodiment, a plurality of flat sections successively connected by three-dimensional sections wherein each three-dimensional section has planar surfaces which, when extended, define a prism. Each prism mates with a succeeding similarly defined prism when the product is folded to space, support and align alternate flat sections into a sandwich-type panel construction.

A method and apparatus for making the invention is disclosed and discussed in detail hereinafter.

Other objects, advantages and features of this invention will become apparent when the following description is taken in conjunction with the accompanying drawings in which.

Figure 1:
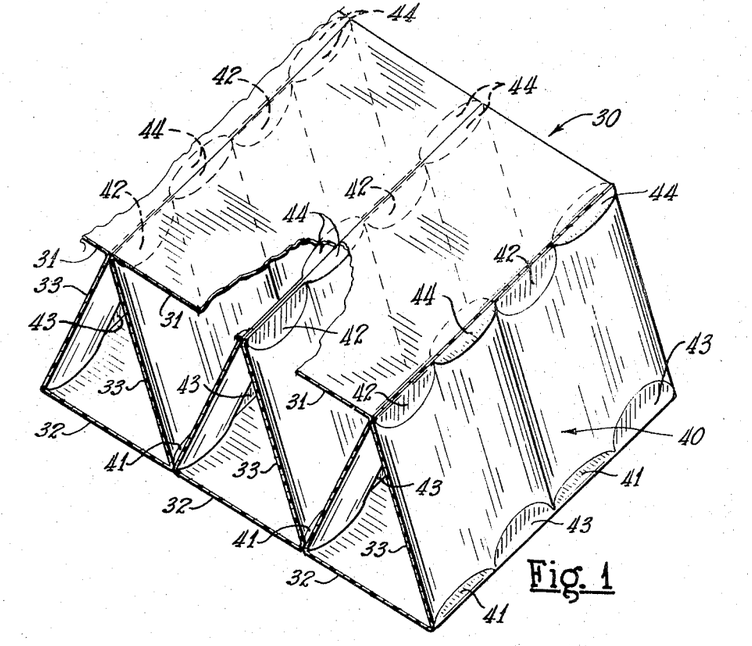
FIG. 1 is an isometric view of a preferred embodiment of the product of the present invention taken from above.
Figure 2:
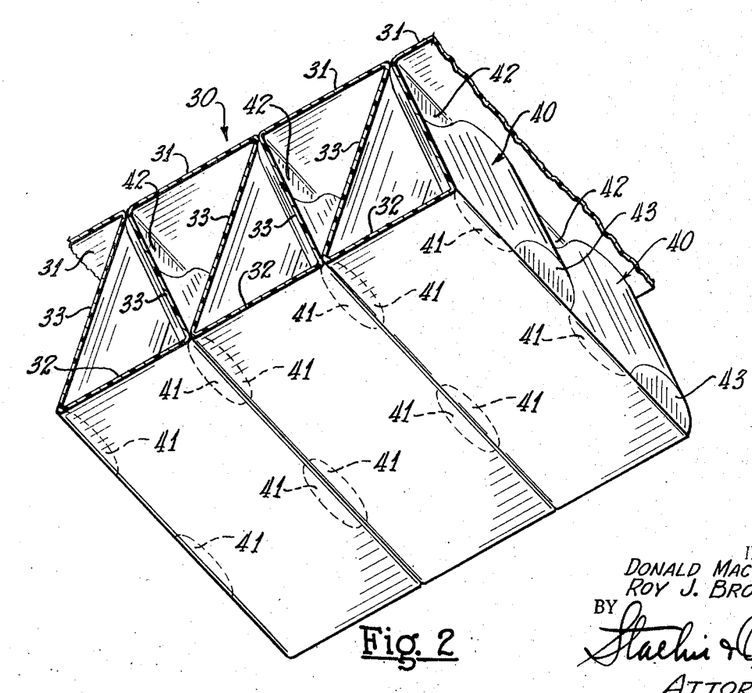
FIG. 2 is an isometric view of the product illustrated in FIG. 1 taking from a vantage point below the product.

Referring to FIGS. 1 and 2 there is shown a sandwich-type panel construction embodying the teachings of this invention. As was noted hereinbefore, there has been a great deal of difficulty in fabricating a sandwich-type panel construction of the low cost, high strength variety. There have been particular difficulties in the fabrication of the structure with resin impregnated fibrous material since, although many fibrous materials have a great deal of strength in tension their strength in compression is not great compared to that of the matrix in which the fibrous materials are embedded. This is particularly true of glass fibers which have extremely high tensile strengths. Another problem has been found in the tendency of the facings to shear along the necessarily acute adhesive lines between the core and the facings, whether the material is of the resin impregnated fiber, metal or other. A further difficulty rises in the fabrication of the core with respect to the facing to provide a continuous production line and yet attain the high strength characteristics desired when the thickness of the sandwich exceeds a distance wherein a resin column in compression is reliable, e.g. one-half inch, unless the thickness of the resin column having the reinforcement embedded therein is such that the weight of the column exceeds a desired value in an effective weight-to-strength ratio.

In the preferred embodiment of the structure 30 shown in FIGS. 1 and 2, substantially flat sections 31 and 32 are held in a spaced and aligned position by transversely extending sections 33. Each section 33 is corrugated into a transversely extending row 40 of ridges and furrows. Referring to FIGS. 3 through 7 it will be noted that each ridge has a spacing surface 42 formed at one end and a support surface 41 formed at the other end with both surfaces inclined toward the middle of the ridge. The adjacent furrow of the corrugation has a support surface 44 and a spacing surface 43 formed at opposite ends of the furrow and, as with the ridges, the surfaces are inclined toward the middle of the furrow. Referring again to FIGS. 1 and 2 it will be noted that support surfaces 41 of the ridges of the corrugations 40 abut against the facing section 32. The spacing surface 42 at the opposite end of the ridge abuts against a similar spacing surface 42 of an adjacent ridge of the next transverse row of corrugations. Thus, support surfaces 41 provide support, other than a line contact, for the facing sections 32. Spacing surfaces 42 align the corrugation and provide a surface other than a line contact surface for the corrugation to push against when a load is received on facing 32.

Support surface 44 of the adjacent furrow abuts against facing section 31 while spacing surface 43 at the other end of the furrow abuts against a similar spacing surface of an adjacent furrow. The surfaces 44 and 43 provide the same function for facing section 31 as surfaces 41 and 42 provide for the facing section 32. This configuration removes the problem of shearing along a line contact between facing section and core member since the line contact points are interspersed with flat support surface contact areas and since the adjacent ridges and furrows are integral in one transversely extending row of corrugations.

While the structure just described is of value when the panel is made of any material, it becomes even more valuable when the panel is constructed from resin impregnated fibrous material. For example, if a glass fiber reinforcement is embedded in a resin matrix in this invention the glass fibers may be oriented within the matrix such that when a compressive load is received on the facing sections 31, 32 the fibers are stressed through the designed tendency of the corrugated sections to buckle. A further advantage of this structure when utilizing a resin impregnated fibrous material is that there are neutral axes along the corrugations which have no buckling tendency when a load is applied to the facing sections 31, 32. The volume of the resin matrix around the fibrous material may thus be reduced along these neutral axes thereby reducing the total volume of resin involved and improving the strength-to-weight ratio of the panel. In addition to the advantageous use of support and spacing surfaces formed by the ridges and furrows of the corrugations, the advantage of being able to properly orient fibers to stress them and the advantage of being able to reduce the resin content of the panel, the corrugations themselves are stronger in compression than a planar surface of resin, constructed and used in the same manner without regard to the fibrous content. Therefore, the advantages are equally applicable to use of such a structure with a metal or other different material in the fabrication.

The advantageous characteristics of the structures illustrated lend themselves readily to continuous production on a line. Referring to FIGS. 3 through 7 the details of the three-dimensional configuration are disclosed with greater clarity. When the product is flattened out it is revealed as a sequence of successively hinged sections. Alternate ones 31, 32 of the sections form the first and second facings of the sandwich. Every other one (31) forms a first facing of the sandwich construction when folded and the remaining ones (32) of the alternate sections form a second facing of the construction when folded. The sections 33 in between the facing sections 31, 32 are corrugated with transverse rows 40 of axially extending ridges and furrows. The hinging between the successive facing and corrugating sections is accomplished along the line intermediate the axially extending peak lines of the adjacent ridges and furrows thereby allowing the formation of support and spacing surfaces at each end of each ridge and each furrow. As noted hereinbefore, each of the ridges and furrows has support surfaces 41, 44 formed at one end and spacing surfaces 42, 43 formed at the other end. By examining various views of the unfolded structure it can be seen that this is a configuration which may be easily molded by a stationary mold or by endless belts having mating surface embossments formed thereon.

Figure 8:
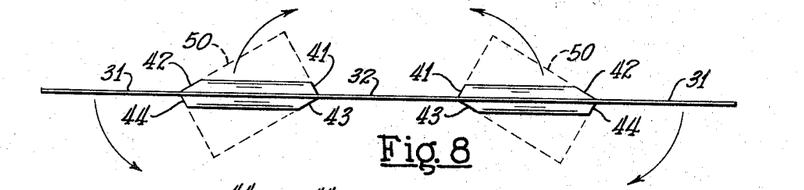
FIG. 8 is a schematic view of the structure taken before folding and illustrating the principles of this invention.
Figure 9:
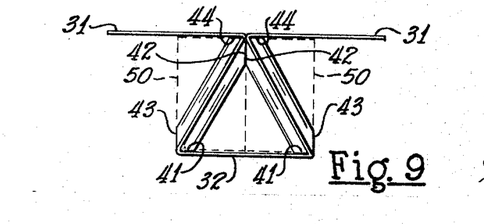
FIG. 9 is a schematic view of the structure of FIG. 8 after the folding is completed.

Referring to the schematic line drawings of FIGS. 8 and 9 there is indicated the principle upon which the present invention operates. Each of the planar surfaces (support and spacing surfaces) 41, 42, 43, 44, when extended, define a transversely extending prism 50 as outlined by the dotted lines in FIG. 8. In this particular embodiment the prisms are rectangular parallelepipeds. It is obvious if rectangular parallelepipeds 50 are folded over section 32 as indicated by the arrows in FIG. 8, while the facing sections 31 are folded back over the top of the parallelepipeds 50, that the structure as shown schematically in FIG. 9 will result. Since the principle may be utilized of successively mating prisms for supporting, spacing and aligning purposes without the formation of the entire rectangular prism only the planar surfaces 41 through 44 need be formed to accomplish these spacing, supporting and aligning functions. By reducing the extension of the planar surfaces 41 through 44 to a calculated minimum for each application the depth of the corrugations connecting the planar surfaces 41 through 44 is decreased and the strength-to-weight ratio of the sandwich-type panel may be increased. Thus, the cost of the panel is reduced.

Figure 10:
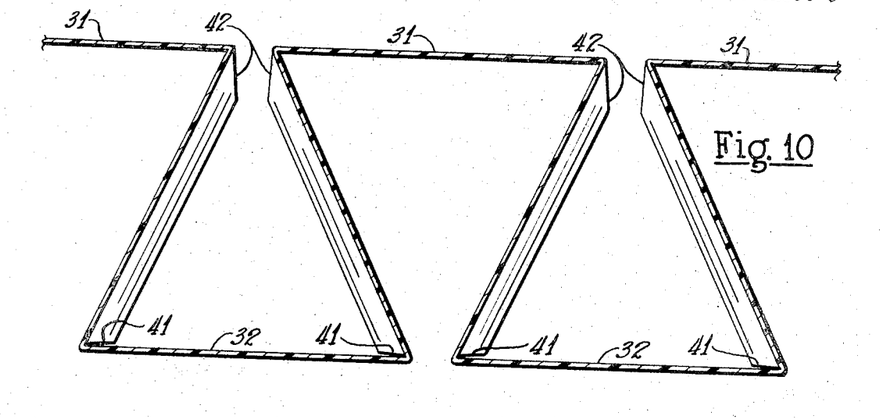
FIG. 10 is a cross sectional view of the first column of axially extending corrugations of the structure of FIG. 1.
Figure 11:
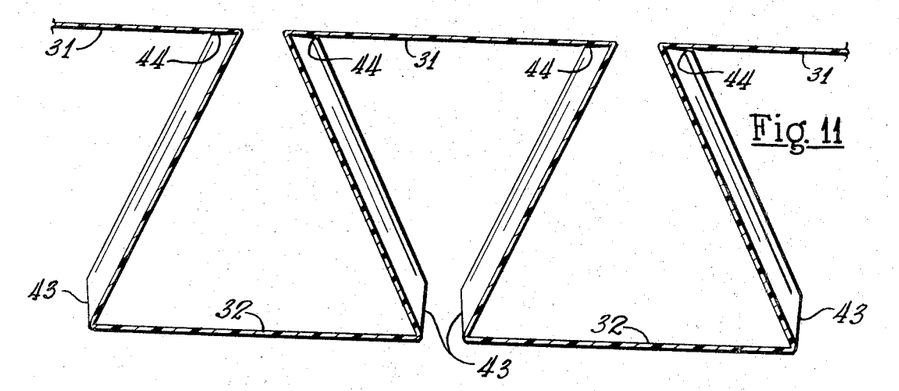
FIG. 11 is a cross sectional view of a second axially extending column of corrugations of the structure shown in FIG. 1.

Referring to FIGS. 10 and 11 there are shown enlarged cross sectional views of adjacent ridges and furrows to further aid in understanding the principle and operation of this invention. In both FIGS. 10 and 11 the surfaces are shown just before they abut and in the position wherein an adhesive may be applied to permanently join the abutting surfaces.

In FIG. 10 the planar supporting surfaces 41 will abut against the lower facing sections 32 when the structure is in its fully folded position. Similarly, spacing surfaces 42 from adjacent rows will abut. Referring to FIG. 11 planar support surfaces 44 will abut the top facing sections 31 when the product is in the fully folded position. Similarly, planar spacing and aligning surfaces 43 will abut as shown.

If this structure is formed from a resin impregnated mat or metal or other material the folding of the sections in the desired direction may be aided by reducing the thickness of the area at the fold point on the side toward which the fold is to be made. In the case of a resin impregnated mat an extension of the mold into the mat from the side toward which the fold is to be made will deprive or starve that area of resin making it bendable in the direction desired. Thus, a hinging process is achieved. Pintle or other type hinges might be used in certain applications as discussed hereinafter.

For greater strength outer skins may be applied or affixed to the facing sections 31, 32 after the folding is accomplished. Outer skins may also be applied for decorative purposes or when a particular function is desired of the exterior surface other than strength alone. Obviously, reflective surfaces, blackboard surfaces, acoustic surfaces, information bearing surfaces, etc., may be incorporated into the panel as it is made.

Figure 3:
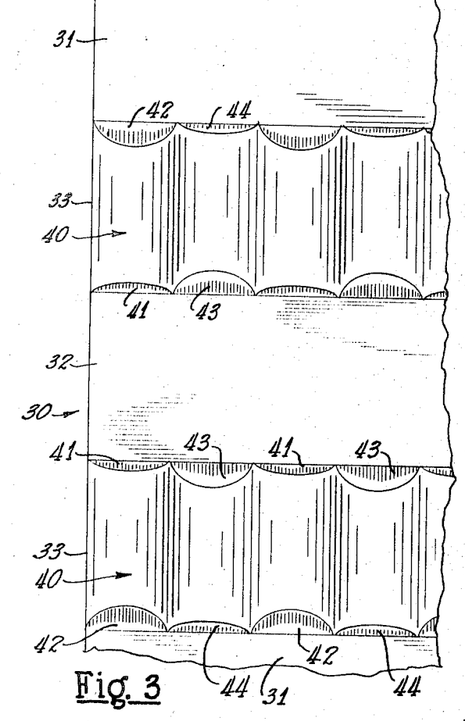
FIG. 3 is a plan view of a preferred embodiment of the invention as it might be formed on a production line and before it is folded into the structure illustrated in FIGS. 1 and 2.
Figure 4:
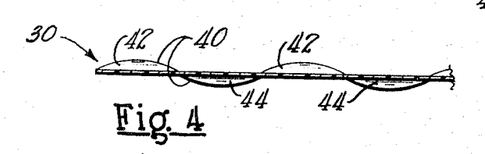
FIG. 4 is an end view of the embodiment illustrated in FIG. 3.
Figure 5:
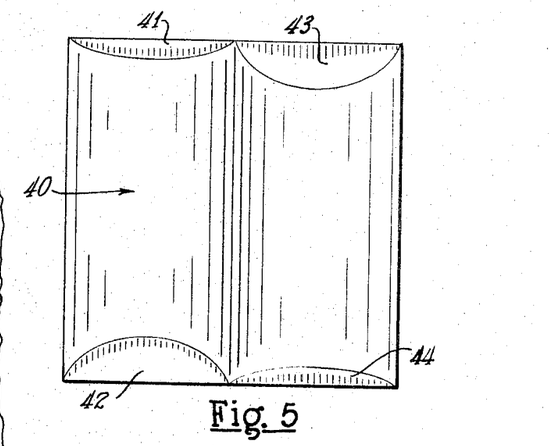
FIG. 5 is a fragmentary view of the structure of FIG. 3 enlarged to clarify the detail.
Figure 6:
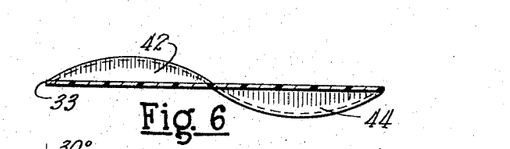
FIG. 6 is an end view of the enlargement shown in FIG. 5.
Figure 7:
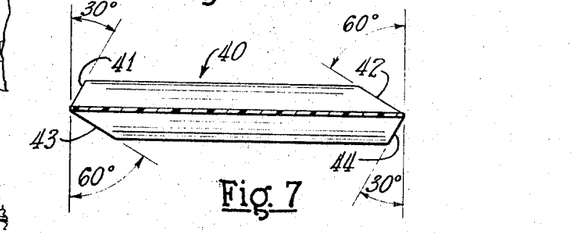
FIG. 7 is a bottom view of the enlargement shown in FIG. 5.

It is not necessary in the present invention to fabricate the panel to a final folded position after the molding is accomplished. For example, the panel may be molded in a configuration as shown in FIG. 3 and manufactured in a desired length. Rather than then forming the panel into the sandwich structure illustrated in FIG. 1, it may be desirable for shipping purposes to simply roll the product shown in FIG. 3 into a bundle or fold along widely separated hinging points into substantially flat and stacked sections the product of FIG. 3 for shipping, requiring less space. The product of FIG. 3 then could be assembled into its final form by portable machinery at the job site or by hand between guide rails if a particular application would allow same. In this type of application outer skins could easily be formed by the use of spray-type or other liquid vinyl and/or adhesive rather than require that the outer skins be of a one piece resin, vinyl, etc., when working with the resin impregnated fibrous material. An outer skin of sprayed vinyl at the job application may be utilized even when the product of FIG. 3 is fabricated from metal. With the use of U-shaped guide rails or channels at each side of the sandwich panel construction it may not be necessary to apply outer skins to the facing sections 31, 32. If the material used along the hinging line is of the type that does not fatigue readily or, as in the case of some materials actually improves with repeated bending, the use of the U-shaped side rails or channels with the product in the form shown in FIG. 3 may allow the sandwich panel construction to be formed and then dismantled for use in another area after the job is through. It may be desirable if the structure is of metal to use pintle-type hinges between successive sections.

Figure 12:
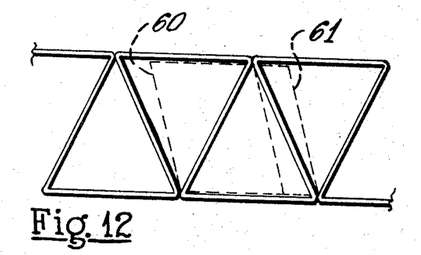
FIG. 12 is a schematic line drawing illustrating an alternative embodiment of the invention.
Figure 13:
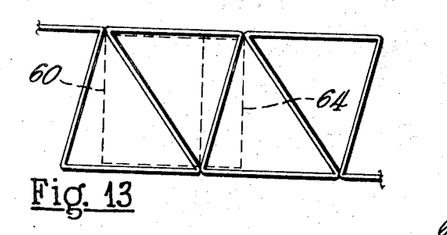
FIG. 13 is a schematic line drawing illustrating another embodiment of the invention.
Figure 14:
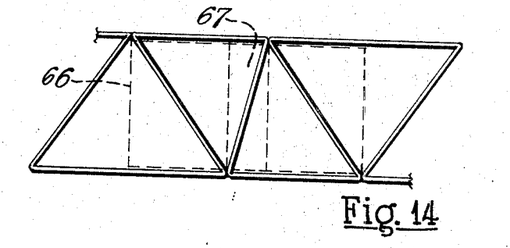
FIG. 14 is a schematic line drawing illustrating still another embodiment of the invention.

Referring to FIGS. 12 through 14 there are shown variations in schematic line diagrams of the successively mating prism principle for the substantially flat panel construction. In the preferred embodiment shown in the prior figures the diagonals of the prisms combined with the facing sections to form equilateral triangles in the fully folded position. As noted in FIG. 7 the planar abutting surfaces 41, 44 were then required to be formed at an angle of 30° with respect to a plane perpendicular to the travel of the mat through a mold. Similarly, the planar spacing surfaces 42, 43 were required to be formed at an angle of 60° with respect to a plane perpendicular to the travel of the mat through the mold. These requirements were necessary in order to maintain the definition of a rectangular prism. The definition of a rectangular prism by the planar support and spacing surfaces is the most desirable since this means that the spacing surfaces 42, 43 will abut similar spacing surfaces at an angle least likely to cause any shear stress on any adhesive placed between these surfaces when a compressive load is on the facing sections 31, 32.

If the compressive load on the facing sections is not a factor then the prisms defined may be other than rectangular as shown in FIG. 12 while still supplying a spacing, aligning, and supporting function. The prisms 60, 61 thereby defined, however, must be such that they will mate with a successive prism to, in this case, maintain the facing sections parallel. FIG. 12 illustrated also an embodiment in which the diagonals are disposed in isosceles triangle arrangements.

FIG. 13 is a line schematic drawing illustrating a variation in which the diagonals combine with the facing sections to form oblique triangle arrangements. In FIG. 13 it is noted that in order to maintain the planar spacing surfaces perpendicular to the facing sections in the folded position that successive identical prisms 63, 64 may not be defined. However, the requirement that successive prisms be defined that mate to maintain the facing sections at the desired distance apart is met. Similarly, FIG. 14 discloses a prism definition arrangement wherein the diagonals of the prisms 66, 67 are disposed in an irregular oblique triangle arrangement. In all of the arrangements discussed heretofore the successive hinging is accomplished at the ends of the connecting diagonals of the prism. The altitude of all the prisms, of course, when in a folded position must be the same as the desired thickness of the sandwich.

Figures 15, 16, 17:
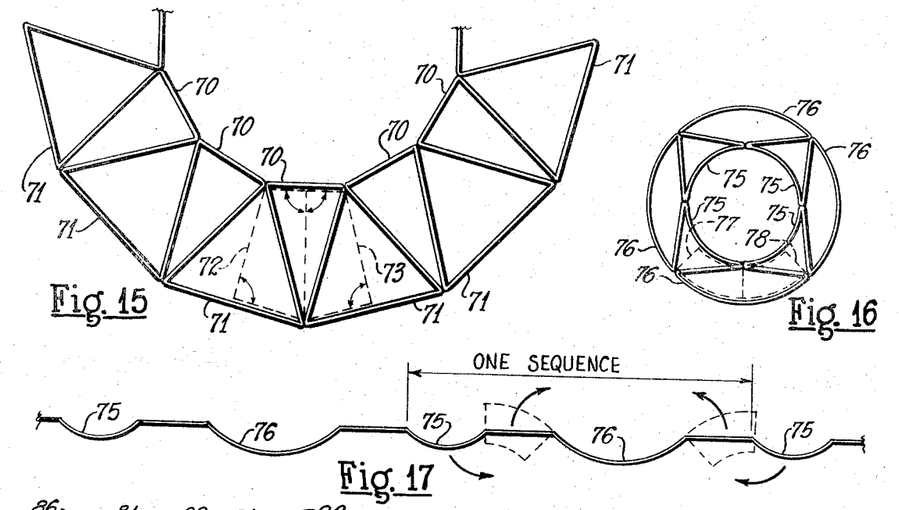
FIG. 15 is a schematic line drawing illustrating an embodiment of the invention utilized to form arched panel structures.
FIG. 16 is a schematic line drawing to show an embodiment of the invention for forming cylindrical panel structures.
FIG. 17 is a schematic line drawing of the structure of FIG. 16 before folding.

Referring to FIG. 15 there is illustrated by a line schematic drawing how the principles of the instant invention may be applied to provide an arched sandwich-type panel construction. In the structure of FIG. 15 there is only one variation. That is, the lengths of alternate ones 70 of the facing sections are identical while the lengths of the remaining ones 71 of the facing sections are identical but longer than the alternate facing sections 70. As shown by the dotted line, successive prisms 72, 73 must be defined that will mate and perform the spacing, supporting and aligning functions. Arched structures of this nature would be useful in roofing applications where the sandwich panel construction might have to extend for a length without support other than its own strength. It should be noted that this principle may be applied not only to form a single arch as shown but to form a series of undulations by reversing the length of the top and bottom or inner and outer facings at predetermined intervals.

It should be noted that if sufficient successive sections of the sandwich-type construction illustrated in FIG. 15 are folded into position that the arch will close upon itself and a conduit will be formed. The cross section of the conduit will be that of a regular polygon. In order to attain the greatest strength possible in the case of a closed or conduit configuration, outer and inner skins may be applied. If the skins are of a resin impregnated fibrous material the strength will be improved if the fibers are oriented so that they are stressed in tension. The greatest strength will be attained if a single continuous fiber or strand were oriented circumferentially about the conduit for a plurality of wraps.

Referring to FIGS. 16 and 17 there is illustrated in a schematic line drawing an application of the instant invention to provide arcuate inner and outer surfaces rather than arches composed of portions of a regular polygon. As can be best seen in FIG. 17 the schematic line drawing represents the desired molding surfaces as shown impressed upon a mat or other material to be molded in order to form the folded configuration of FIG. 16. The facing sections 75 and 76 are formed in the shape of arcs rather than substantially flat as hereinbefore illustrated. The three-dimensional configurations 77, 78 connecting the facing sections 75 and 76 again must define surfaces which will abut and support the outer facing from the inner facing as well as spacing surfaces that will abut and space and align a preceding section from a succeeding section when folded. For the greatest strength as well as the most advantageous aligning functions the abutting planar spacing surfaces may best be formed along radials of the arc being defined by the sandwich panel construction.

As with respect to FIG. 15 sufficient sections may be folded to cause the arc to close upon itself and form a hollow cylindrical pipe or tube of sandwich construction. Again, as with respect to FIG. 15, inner or outer skins may be applied to the facing sections to improve the strength of the construction.

Figure 18:
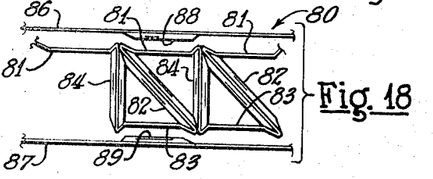
FIG. 18 is a line drawing illustrating a still further embodiment of the invention.
Figure 19:
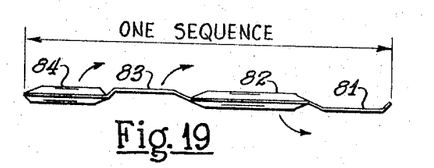
FIG. 19 is a schematic line drawing of the apparatus or structure illustrated in FIG. 18 before the folding process.

Referring to FIGS. 18 and 19 there is illustrated with schematic line drawings a still further embodiment of the teachings of this invention. The core 80 of the sandwich construction may be constructed from sequences of successively hinged sections wherein the sequence includes a first facing section 81, a diagonally extending spacing and supporting section 82, a second facing section 83, and a vertically extending spacing and supporting section 84. FIG. 19 illustrates the molding sequence and, with the arrows, the direction of the fold to form the final sandwich core 80. It is also to be noted that facing sections 81 and 83 may be molded to assume three-dimensional configurations in order to reduce the angular displacement of the spacing and supporting planar surfaces that are required to be formed in the sections 82 and 84. While it is possible to utilize the core 80 without outer skins 86 and 87, depending upon the application, the outer skins 86 and 87 will add more strength to the embodiment shown. Further, the outer skins may have inwardly extending embossments 88 and 89, respectively, which may mate with inwardly extending three-dimensional facing sections 81 and 83 to improve the strength as well as assist in affixing the skins 86, 87 by adhesives and to avoid possible shearing or peeling problems. FIGS. 18 and 19 illustrate the use of diagonals and verticals that may be required for some applications. It will be noted that in the structure shown in FIG. 18 that the planar surfaces that either abut or support, when extended, still form the successive mating prisms that are advantageous for the supporting, spacing and aligning features of this invention.

Figure 20:
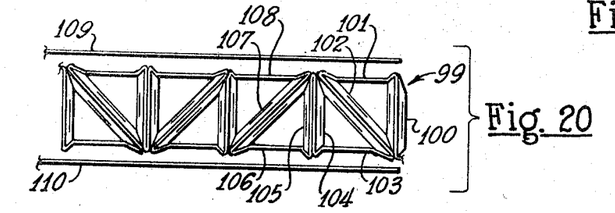
FIG. 20 is a schematic line drawing of yet another embodiment of the present invention.
Figure 21:
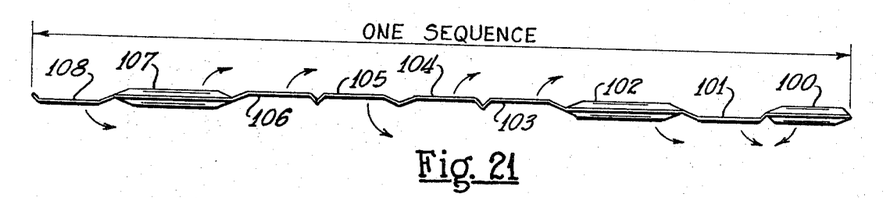
FIG. 21 is a schematic line drawing of the structure of FIG. 20 before the folding.

Referring to FIGS. 20 and 21 there is illustrated a folding process and configuration which may be utilized to supply a diagonal bracing on each side of a vertical support or bracing. That is, there is illustrated in FIGS. 20 and 21 a product, adapted to be formed by folding into a sandwich panel construction, which comprises a sequence of successively hinged sections including a first vertical section 100, a first top facing section 101, a first diagonal spacing section 102, a first bottom facing section 103, a second vertical spacing section 104, a third vertical spacing section 105, a second bottom facing section 106, a second diagonal section 107, and a second top facing section 108, hinged in that order. The diagonal and vertical sections are three-dimensional configurations as described hereinbefore having planar surfaces which, when extended, define mating prisms which space, support, and align the top and bottom sections. As described with respect to FIGS. 18 and 19 top and bottom sections 101, 103, 106, 108 may also be three-dimensional configurations having planar surfaces, which, when extended, define prisms that mate with the prisms of the diagonal and vertical sections. This avoids having to form the planar supporting, spacing, and abutting surfaces at an angle any sharper than necessary from the mat. Outer skins 109 and 110 may be affixed with or without inwardly extending embossments as illustrated in FIG. 18.

Figure 22:
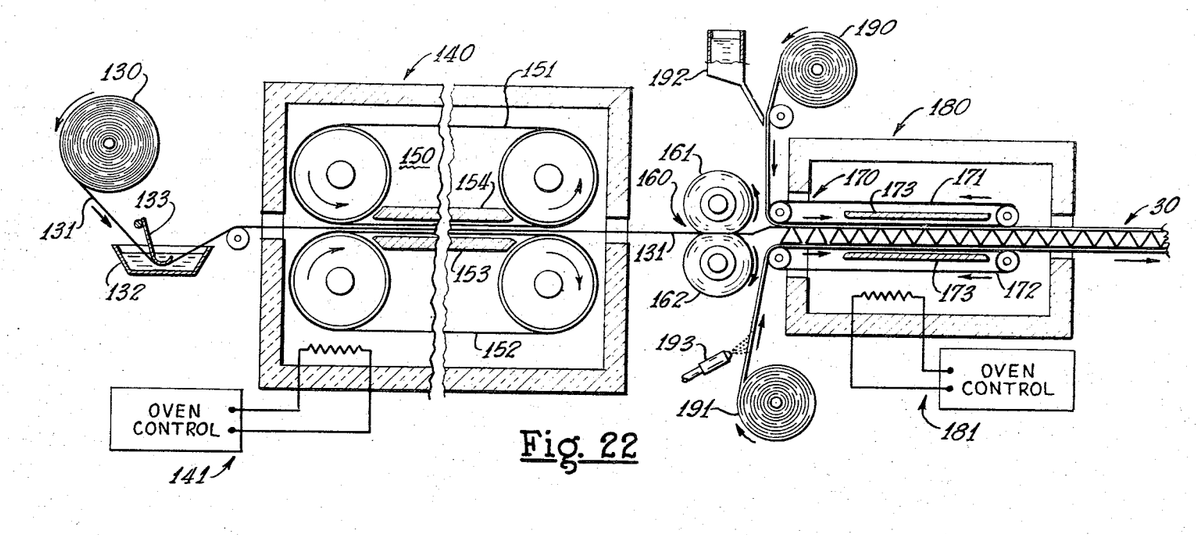
FIG. 22 is a schematic drawing of a means for manufacturing an embodiment of this invention.

Referring to FIG. 22 there is illustrated apparatus providing means for manufacturing the product described hereinbefore. A mat 131 is taken from a supply 130. In the case of resin impregnated fibrous material processing the supply 130 may be a roll of previously formed mat material or the supply 130 may represent a continuous mat forming line such as is well known in the art, whether the mat be woven, wrapped, or of a random chopped-strand type. The mat is passed through a resin tank 132 and is immersed by a diverter 133. The resin impregnated mat is then passed through molding means 150. The molding means illustrated in FIG. 22 comprises a pair of endless belts 151, 152 having mating surface embossments formed thereon to provide the three-dimensional configurations described hereinbefore. The endless belts may be passed between supporting shoes 153, 154 which will maintain a constant separation of the belts and thus a constant thickness of the sandwich panel formation.

In the case of a resin impregnated fibrous material the molding is advantageously performed within an oven or other heating means 140 having oven controls generally indicated at 141 to control the temperature therein. After the mat 131 has been molded and either cured or partially cured in oven 140 it is passed between handling and guiding means 160. The means 160 comprises a pair of partially inflated resilient roller means which can handle the partially cured molded mat 131 without disturbing or fracturing the configurations formed therein. The mat 131 is then received by folding means 170. In the present instance the folding means 170 comprises a pair of endless belts 171, 172 driven at a speed slower than the molded mat 131 is guided into said folding means from said guiding and handling means 160. The successively hinged sections will therefore fold into the desired configurations and, with the assistance of the supporting and aligning means form the completed sandwich-type panel 30. Outer skins may be applied from supplies 190 and 191. Adhesive or additional resin may be supplied to the skins by either a doctor-type means 192 or spray nozzle type means 193. If outer skins are not desired, additional resin or adhesive means may be supplied directly to the sandwich panel structure as it is in the process of being folded either by a doctoring method or a spraying method to secure the fold in place when completed. The folding, additional skin application, and final curing, advantageously is performed within oven 180 having an oven control 181 therein to hold the temperature within the desired range. Shoes or platens 173 may be utilized in conjunction with the endless belts 171, 172 to insure a proper spacing of the belts during the folding process.

In reviewing the process it is possible to mold and cure the basic mat between mated resilient belts having surface embossments such as will impart the configurations desired in the base mat. Resin may be introduced to a glass fiber mat or web prior to the introduction of the mat to the curing oven. The mated belts then engage the impregnated mat to impart the desired shaping thereto. It has been found that belts of resilient material are ideally suited to this molding operation since the resiliency of the belts permits a combination of irregularities such as clumps of glass fibers which might be present. Thus, less resin is necessary to assure complete encapsulation of the web or mat than would be necessary in making a similar product between matched metal molds. That is, in molding between non-resilient molds, sufficient resin is necessary throughout the product to assure encapsulation of the largest clumps of fibers which may comprise only a small area portion of the total mat.

Molding with resilient belts also permits formation of a product having a much greater glass or other fiber-to-resin ratio than is possible by use of matched metal molds. Because of the resiliency of the mated belts, a differential pressure is exerted generally in the plane of the mat as well as transversely thereto. Because of this distribution of the mold pressure over the width of the mat, the method of molding between resilient surfaces will allow variation in resin thicknesses in a continuous mat manufacturing process.

The belt material is advantageously a silicone rubber adapted to room temperature vulcanization. In selecting a material for the belt it is necessary to consider the fact that peroxide is an agent used in the vulcanization of rubber. Thus, any resin which requires peroxide as a catalyst would tend to eat away at the rubber belts. Silicone rubber belts are of this character. Another consideration is the type of solvent required for cleaning of resins from the belt in case of accidental jamming. In this respect, the belt might be required to withstand cleaning solvents such as acetone and a peroxide catalyst. The belt material must also have a good parting characteristic in relation to a resinous sheet or mat. By use of resilient mated belts, release of the panel from the belts is effected, in a sense, by picking the molded panel from the exit nip. The belts, because of the resilience, thus act somewhat as their own parting means. The belts are sharply bendable over a small arc thus facilitating a ready separation from the molded panel in contrast to drum-type molds which would be limited to gradual separation from the finish sheet or panel. Drum-type molding may require the aid of parting materials such as cellophane.

Another important advantage is that the heat present or built up in the molding belt assists in curing during the molding operation by kicking over the exothermic reaction. Upon engagement with the resin, the belt will have a temperature in the order of 200° F. and the resin will be at room temperature of approximately 70° F. The belt will thus transfer heat to the resin and the combination of the belt and resin may go to a temperature, for example, in the order of 130° F. This kicks over the exothermic reaction of the resin and causes the resin to rise to a temperature in the order of 400 to 450° F. The belt, at this time, being at a temperature lower than the resin, will act as a heat sink and will absorb the exothermic heat, causing the belt to rise and the resin to cool to a temperature in the order of 200 to 250° F. The belt thus acts as an integral part of the heat cycling mechanism, first to transfer heat to the resin, and then to absorb the heat therefrom. The mass of the material in the belt must therefore be considered and properly selected to promote the optimum thermal cycling of the mat during the molding.

In developing a continuous process for forming this sandwich construction panel it is advantageous that two curing ovens be used. The first oven is used to form the basic sheets by feeding and resin impregnating a glass fiber mat at one end of the oven and passing the impregnated web between the heated resilient belts. At the exit end of the oven the cured or semi-cured mat is passed between handling means which cause a longitudinal compression or contraction of the sheet to accordinate the planar form, in the preferred example, to a triangular shaped cellular form with two spaced horizontal surfaces provided by alternate segments of the sheet.

Surfacing webs or skins may be applied to the horizontal faces of the accordinated or folded form upon its emission from the longitudinal compression zone or perhaps in some applications prior or in conjunction with the entry to the compression zone. The surfacing skins or webs may have resin or an adhesive applied thereto prior to being brought into contact with the panel faces. After receipt of the surfacing webs, the assembly is passed into a second curing oven and pressed between belts which advantageously would be of the same material as the belts used in molding the configurations into the mat. Upon emission from the second curing oven, the panels will be ready for edge trimming and for cutting to length.

There has thus been described a method or process of making a sandwich panel construction comprising the steps of forming a plurality of sections successively connected by three-dimensional sections, forming planar surfaces on each of said three-dimensional sections which, when extended, define a prism, sizing each said defined prism to mate with a succeeding prism, and folding said prisms and flat sections whereby said prisms space, support and align alternate flat sections into facings of a sandwich construction. In the preferred embodiment the three-dimensional sections are formed into transversely extending corrugations having ridges and furrows with the further step of forming the planar surfaces at the end of each ridge and furrow which incline toward the middle of the corrugations. In the case of a process utilizing resin impregnated fibrous materials glass fibers may be oriented into the sections whereby a compressive force on the facings of the sandwich panel will stress said glass fibers when the diagonally inclined core members tend to buckle. If the fibrous materials are to be utilized the further step of impregnating a mat, which may be of glass fiber, with thermo-setting resin before the molding step, is utilized. A further advantageous step in the process is that of controlling the heat during the section forming or molding step by molding between two endless belts having sufficient mass to act as a heat sink during the exothermic portion of the molding step and to retain sufficient heat to initiate the exothermic reaction of the incoming resin. As a still further step in the sandwich panel construction outer skins may be affixed to the facings after the folding step.

Outer skins may be cast directly over the facings or bonded to the facings with adhesive. In either case material tends to penetrate between spacing surfaces due to applied pressure and capillarity, thereby bonding these surfaces together. When hinges are developed by depriving a mat of resin as hereinbefore described, the adhesive or integrally cast material also penetrates between supporting and facing surfaces bonding these abutting surfaces together. It is to be further noted that when the depth and height of the corrugations are increased the effective spans of the diagonally inclined portions of the spacing members are reduced permitting the use of thinner, lighter weight elements.

While emphasis has been given to the folding feature of the product it should be remembered that the product is basically two opposed faces separated and supported by webs diagonally inclined between the two faces and being corrugated along their length. More generally, the webs are non-planar members shown as having rises and depressions about a longitudinal median plane for the web member.

It should also be noted that while emphasis has been given to the method disclosed for producing the products described herein that the method utilizes novel features useful elsewhere. Broadly, the method of treating a fiber mat includes the steps of impregnating the mat with a liquid and pressing the impregnated mat between surfaces to remove voids. At least one of the surfaces is sufficiently resilient to yield to obstructions having dimensions exceeding the spacing of the surfaces. That is, a clump of fiber, for example, will not hold the surfaces far enough apart to create a void. The resiliency is also useful in preventing voids that might result when the liquid is a resin or other material that may have dimensional changes during or after a cycle that converts the liquid to another form. If the liquid is a thermo-setting resin, as in the preferred embodiment, then a further step may be used of heating the mat while between the surfaces to initiate a thermo-setting cycle of the resin. It is most advantageous to utilize silicone rubber for the surfaces discussed since although its resiliency is sufficient for the purposes discussed above it also has sufficient hardness to accomplish a molding of the mat, if desired. Further, the silicone rubber will readily part or peel from the mat after treatment without any sticking problems.

In conclusion, it is to be noted that the embodiments disclosed and described herein are meant to be illustrative only and not limiting in any sense. The embodiments serve to illustrate the spirit and scope of the invention.

We claim:

1. A self-aligning sandwich construction comprising a plurality of successively hinged sections, alternate ones of said sections forming the first and second facings of said sandwich; every other one of said alternate sections forming a first facing of said sandwich construction, and the remaining ones of said alternate sections forming a second facing of said construction; said sections in between said facing sections being corrugated into transverse rows of ridges and furrows; said hinging between said successive facing and corrugated sections being along a line intermediate the axially extending peak lines of adjacent ridges and furrows; each of said ridges and furrows having a support surface formed at one end and a spacing surface formed at the other end; said support and spacing surfaces being inclined toward the middle of their respective ridges and furrows; a support surface at one end of a ridge abutting against said first facing while a spacing surface at the other end of said ridge abuts against a similar spacing surface formed in a ridge in an adjacent corrugated section; a support surface at one end of a furrow abutting against said second facing while a spacing surface at the other end of said furrow abuts against a similar spacing surface formed in a furrow in an adjacent corrugated section; said support and surfaces thereby properly aligning, spacing, and supporting said facings and said corrugated sections, said corrugated sections having reinforcing glass fibers therein oriented so that the fibers are stressed in tension when compressive forces are applied to said facing sections tending to buckle said corrugated sections.

2. A product as defined in claim 1 wherein said facing sections are of the same length thereby forming a substantially flat sandwich panel.

3. A product as defined in claim 1 wherein every other one of said facing sections are of the same axial length while the remaining facing sections are of identical longer axial lengths, thereby causing the formation of an arched sandwich panel construction.

4. A product as defined in claim 1 wherein alternate ones of said facing sections are arcuate in cross section and of identical arc lengths while the remaining ones of said facing sections are also arcuate in cross section but have longer identical arc lengths, thereby causing the formation of an arcuate sandwich panel construction.

5. A product as defined in claim 1 wherein said sections are formed of glass fiber embedded in a matrix, said corrugated sections having neutral axes receiving less force than the remaining axes when the facing sections receive a compressive force, that matrix material surrounding said neutral axes being reduced in volume thereby improving the strength-to-weight ratio of the panel.

References Cited

UNITED STATES PATENTS

| | | | |
|---|---|---|---|
| 563,775 | 7/1896 | Lantzke | 161—137 |
| 1,855,161 | 4/1932 | Wyman | 161—137 |
| 2,406,051 | 8/1946 | Weiss | 156—462 |
| 2,737,227 | 3/1956 | Brummel | 161—132 |
| 3,217,845 | 11/1965 | Reynolds et al. | 52—618 |

FOREIGN PATENTS

| | | |
|---|---|---|
| 1,324,863 | 3/1963 | France. |
| 1,004,970 | 9/1965 | Great Britain. |

ROBERT F. BURNETT, Primary Examiner

R. O. LINKER, JR., Assistant Examiner

U.S. Cl. X.R.

52—618; 117—65.2; 156—210, 462